United States Patent [19]

Tanaka et al.

[11] 4,255,398
[45] Mar. 10, 1981

[54] NOVEL ETTRINGITE WHISKERS, PRODUCTION AND USES

[75] Inventors: Minoru Tanaka; Genzo Hashizume; Hiroshi Matsui; Satoru Nakagawa, all of Kobe, Japan

[73] Assignee: Hyogo Prefectural Government of Japan, Kobe, Japan

[21] Appl. No.: 52,140

[22] Filed: Jun. 26, 1979

Related U.S. Application Data

[63] Continuation-in-part of Ser. No. 885,554, Mar. 13, 1978, abandoned, and Ser. No. 885,555, Mar. 13, 1978, abandoned.

[30] Foreign Application Priority Data

Mar. 15, 1977 [JP] Japan .................................. 52-29088
Mar. 15, 1977 [JP] Japan .................................. 52-29089

[51] Int. Cl.³ .................... C01F 11/46; C01G 28/02; C04B 7/32; C04B 13/00
[52] U.S. Cl. .................................. 423/117; 423/128; 423/166; 423/555; 423/556; 423/600; 106/104; 106/103; 106/315
[58] Field of Search ............... 423/128, 166, 242, 544, 423/555, 556, 117, 600; 406/85, 88, 50, 95, 103, 104, 105, 119, 110, 315

[56] References Cited

U.S. PATENT DOCUMENTS

| | | | |
|---|---|---|---|
| 3,563,700 | 2/1961 | Stiles et al. | 423/600 |
| 3,720,609 | 3/1973 | Smith et al. | 106/109 |
| 3,855,391 | 12/1974 | Selmeczi et al. | 423/555 |

FOREIGN PATENT DOCUMENTS

| | | | |
|---|---|---|---|
| 2365554 | 11/1975 | Fed. Rep. of Germany | 106/104 |
| 2551308 | 5/1976 | Fed. Rep. of Germany | 423/555 |
| 2613651 | 7/1976 | Fed. Rep. of Germany | 423/555 |
| 51-62826 | 5/1976 | Japan | 423/555 |
| 12242 | of 1896 | United Kingdom | 106/110 |
| 530009 | 11/1976 | U.S.S.R. | 106/110 |

*Primary Examiner*—O. R. Vertiz
*Assistant Examiner*—Gary P. Straub
*Attorney, Agent, or Firm*—Merriam, Marshall & Bicknell

[57] ABSTRACT

This disclosure deals with ettringite whiskers, methods of synthesizing such whiskers and ettringite whisker composites. The ettringite whiskers, having a new crystal form, are 1–2 $\mu$m in diameter, 50–100 $\mu$m in length and approximately 30–50 of aspect ratio. The ettringite whiskers are especially useful in industry as a high tensile strength reinforcement, they increase self-extinguishability and the productive capacity of making sheets, boards of the like.

4 Claims, 7 Drawing Figures

NOVEL ETTRINGITE WHISKERS, PRODUCTION AND USES

This application is a continuation-in-part of our co-pending applications Ser. Nos. 885,554 and 885,555, both filed Mar. 13, 1978, now abandoned.

This invention pertains to ettringite whiskers having a new physical form, a method of synthesizing the ettringite whiskers, and new composites of the ettringite whiskers admixed with pulp, resins, gypsum or cement for industrial uses. The ettringite whiskers are an especially useful industrial material as a high strength reinforcement. They increase the self-extinguishability and productive capacity of making paper sheets, boards and the like.

BACKGROUND OF THE INVENTION

Ettringite is a sulfate double salt with calcium aluminate and has the formula $C_3A.3CaSO_4.32H_2O$ (throughout the specification, the following cement chemist notation will be used in accordance with the general practice in the field of cement chemistry: $C=CaO$, $A=A_2O_3$, $S=SO_3$, and $H=H_2O$). It forms in the initial stage of hydration of portland cement, and once was thought to be a substance harmful to concrete. Later, however, the study by G. L. Kalousek et al., (G. L. Kalousek: "Sulfoaluminates of Calcium as Stable and Metastable Phases," Ph. D. Thesis, University of Maryland (1941)) revealed that the crystals of ettringite, when formed in an unsaturated solution of $Ca(OH)_2$, are prisms or needles, which show great crystal pressure. Since then, it was suggested that ettringite could be used for reducing dry-shrinkage of concrete and for introducing prestress into concrete and, under the stimulus thereof, active development studies have been made to utilize the expansion effect of ettringite, the starting point being used in expansive cement.

Thus, ettringite is now known to be useful as an expansion-producing admixture for cement. Its use is roughly divided into two categoires. One is shrinkage compensating concrete for reducing drying shrinkage, and the other is chemically prestressed concrete for introducing prestress into a structure by taking advantage of the expansive power of ettringite. The former concrete is mainly intended for preventing cracking and is used in slugs for making water tanks, reservoirs, dams, buildings, pavement, bridges and so on, while the latter is mostly intended for incresing cracking resistance or cracking load of factory products, such as concrete pipes, precast concrete floor boards, concrete sheet piles, concrete box culverts and composite concrete-steel pipes.

It is important in an expanded admixture usable for these various purposes that, in hydration, ettringite or its monosulfate, does not precipitate in the liquid phase but that it be formed on the surface of the solid grain, which is the support for hydration. It is clear, as shown in FIG. 1 of the attached drawings, that ettringite crystals should grow on the surface of solid grains, whereas the form of the solid grains remains the same after as before hydration. It has been thought that this ettringite is the source of expansive power in cement hydration. It is the expanded admixture that makes the most of this crystal growth of ettringite eventually formed in the cement hydration process. Such uses are almost all the hitherto known uses of ettringite, and it may be said that ettringite is known only for these uses.

Recently there has been a tendency to synthesize ettringite in liquid phase, isolate the same and search for possible uses thereof as a material for industry, in addition to its use as an expanded admixture for cement as mentioned above. According to one typical research report by Kondo et al., found in Abstracts of Papers, 1973 Annual Meeting of Ceramic Society of Japan, page 106 and in Seramikkusu (Ceramics, a monthly journal), volume 8, No. 10, pages 67 to 73 (1973), needlelike crystals of ettringite were synthesized from $Ca(OH)_2$, $Al_2(SO_4)_3.18H_2O$, $CaSO_4$, $Al_2O_3$ and boehmite ($\alpha$-$Al_2O_3.H_2O$) through $C_3A$. The crystal of ettringite was 2 $\mu$m in length. When the crystals were pressure molded under 500 to 600 Kg/cm$^2$, the product was no more than 0.07 in percentage of void and not less than 800 Kg/cm$^2$ in compressive strength, and it was compacted into a translucent, hardened body after being pressed for a long period or dried gradually. The procedures may be regarded as sintering and hot pressing at an ordinary temperature. However, in the case of monosulfate and satin white (granular crystal having a size of 0.1 $\mu$m, said to have a chemical composition the same as ettringite, and used as a coating material of paper), such a high strength hardened body cannot be obtained. According to another report by Sugi et al. in Technical Reports of Osaka Cement Co., Ltd., No. 40, pages 23 to 28 (1977), experiments were carried out using finely pulverized blast furnace granulated slag (chemical analysis is 36.8% $SiO_2$, 19.1% $Al_2O_3$, 41.3% $CaO$) in the synthesis of ettringite using gypsum (gypsum dihydrate) obtained from exhaust gas desulfurization in a slag/gypsum ratio of from 1 to 1.5 with so-called accelerators such as a 10 to 15% aqueous solution of portland cement, $Ca(OH)_2$, $KOH$ or $NaOH$ in an amount about ten times the quantity of the starting materials. After the mixture was stirred for 20 to 24 hours, ettringite was obtained having a purity of about 60%. The ettringites were needle-like or prismatic crystals and 20 to 30 $\mu$m in length and 2 to 5 $\mu$m in diameter. (refer to FIG. 2).

Although the above reports show that synthetic ettringite crystals have a length of 2 to 30 $\mu$m and, when long and within that range, they are prismatic with a relatively large diameter, synthetic ettringite itself, for reasons relative to their crystalline form, aspect ratio and so forth, so far has had no practical use.

Three of the present inventors have already applied for patents on the methods for manufacturing $\alpha$-hemihydrate gypsum using an exhaust gas desulfurization process and on the resulting gypsum whisker composites (U.S. patent application Ser. Nos. 882,913 and 890,665), and have disclosed therein a method of producing II-anhydrate gypsum needles, namely gypsum whiskers, useful in industry (from needle crystals of $\alpha$-hemihydrate gypsum as a starting material). Due to the fact that the said gypsum whiskers have a large aspect ratio, they are a useful reinforcing material. Because of this, the inventors have tried to prepare highly pure synthetic ettringite whiskers having as aspect ratio much higher than before.

SUMMARY OF THE INVENTION

In accordance with this invention, there is provided novel ettringite crystal whiskers which are 1 to 2 $\mu$m in diameter, 50 to 100 $\mu$m in length and which have an approximately 30 to 50 aspect ratio.

It is an object of this invention to provide the novel ettringite crystal whiskers for use as a reinforcing agent for shaped articles.

It is an additional object of this invention to provide novel ettringite crystal whiskers having excellent properties for use in paper-making, considering the crystal form and low solubility in water of the ettringite whiskers.

It is a further object of this invention to provide novel ettringite whiskers having excellent self-extinguishability for shaped articles because of the high amount of water of crystallization ($3CaO.Al_2O_3.3CaSO_4.32H_2O$) in the ettringite whiskers.

It is a still further object of this invention to provide novel ettringite crystal whiskers which can be admixed or compounded with other materials consisting of one or more of (a) fibrous pulp, (b) resins, (c) gypsum and (d) cement and, as necessary, may further be admixed with (e) fibrous materials for reinforcing purpose and (f) lightweight aggregate.

It is a still further object hereof to provide a method of producing the novel ettringite whiskers by using calcium sulfite as a $CaSO_4$ supplying component of the mixture of CaO, $Al_2O_3$ and $CaSO_4$ components needed to synthesize the novel ettringite crystal whiskers.

BRIEF EXPLANATION OF THE DRAWINGS

FIG. 1 is a photomicrograph of ettringtie growing on the surface of a solid grain as a result of hydration of an expanded admixture;

FIG. 2 is a photomicrograph of prior art ettringite produced according to a conventional method of synthesis;

FIG. 3 is a photomicrograph (500 magnification) of the novel ettringite provided according to the invention and produced by a method of synthesis disclosed herein;

FIG. 4 is a photomicrograph (500 magnification) of gypsum whiskers; and

FIGS. 5 and 7 are photomicrographs of sheets prepared by admixing the novel ettringite crystal whiskers producted by a method of synthesis disclosed herein, with a cellulosic pulp for paper making.

DETAILED DESCRIPTION OF THE INVENTION

The constitution of the present invention will be described in more detail hereinbelow.

Figure 3:
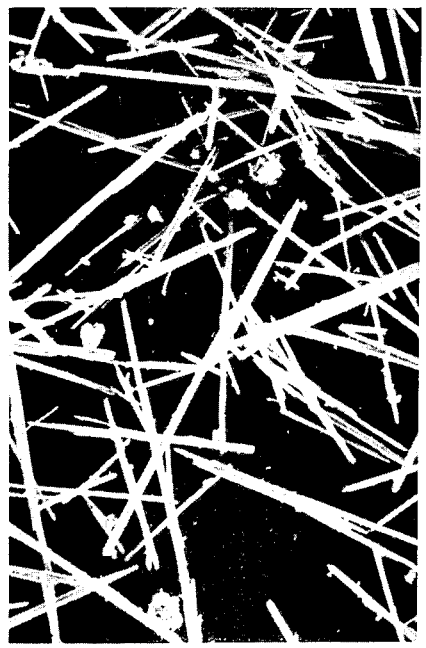

Firstly, the novel ettringite crystal whiskers is described. The novel ettringite crystal whiskers provided by this invention can be represented by the chemical formula, $C_3A.3CaSO_4.32H_2O$. FIG. 3 shows that the crystals are whisker-like materials. They have a crystal from 1 to 2 $\mu m$ in diameter, 50 to 100 $\mu m$ in length and an approximately 30 to 50 aspect ratio. This is shown by the scanning electron microphotograph of FIG. 3 (500 magnifications).

The ettringite crystal whiskers are useful as a reinforcing agent in composites of any shape to improve strength. The high amount of water of crystallization ($32H_2O$) in the ettringite whiskers enhances the desirable properties of the whiskers, and provides self-extinguishability. The whiskers have a low solubility in water (illustrated in Table 1), and desirable electric and adiabatic properties, and so on. Variously admixed composites of the ettringite whiskers with the above mentioned properties have a wide variety of industrial uses.

TABLE 1

Water Solubility of the Ettringite Crystal Whiskers and Gypsum Whiskers

| | mg/100cc of Water | | |
|---|---|---|---|
| | $Ca^{2+}$ | $SO_4^{2-}$ | $Al^{3+}$ |
| Ettringite whisker of this invention | 11.8 | 18.4 | 3.9 |
| Gypsum whiskers | 80.5 | 189.0 | — |
| Ettringite in literature | 9.3 | 15.2 | 1.9 |

Remarks:
The results shown in Table 1 were obtained by shaking a mixture of 3.5 grams of ettringite whiskers produced by the method of the present invention and 500 ml of water at 25° C. in a testing shaker at a rate of 100 times every minute for 5 hours. Gypsum whiskers (calcined at 600° C.) were used for comparison. Further, the solubility data found in the literature for ettringite were cited.

A first method of synthesizing the novel ettringite crystal whiskers uses a slurry prepared by adding about 10 or more parts by weight of water to one part by weight of a mixture of starting materials, namely lime as CaO component, gypsum as $CaSO_4$ component and aluminous material as $Al_2O_3$ component, with the whole or a part of said gypsum replaced with calcium sulfite, effecting oxidation by blowing air into and thereby agitating the slurry at a temperature not exceeding about 100° C., preferably at 70° to 100° C., at an air pressure of 2 to 4 kg/cm², and filtering to separate the novel ettringite whiskers. The ettringite whiskers so obtained can then be dried.

The CaO component used in the process is not limited to lime but may be calcium oxide and/or calcium hydroxide. The $CaSO_4$ component can be calcium sulfite alone or with gypsum, such as calcium sulfate anhydrate, hemihydrate and dihydrate. The $Al_2O_3$ component can be an aluminous material such as an aluminous cement, alumina, aluminium hydroxide, for example gibbsite, bayerite, pseudo-boehmite and aluminium-containing waste sludge. The chemical components and chemical composition of some aluminous materials which can be used are shown in Table 3.

TABLE 2

Chemical Compositions and Crystalline Compositions of Aluminium-Containing Raw Materials

| Sample | | Weight Percent | | | | | | | | | Major Crystalline Compositions |
|---|---|---|---|---|---|---|---|---|---|---|---|
| | | $SiO_2$ | $Al_2O_3$ | $Fe_2O_3$ | CaO | MgO | $Na_2O$ | $K_2O$ | S | P | |
| Aluminous Cement | A | | 41 | 12 | 47 | | | | | | $CA,C_3A,C_2F$ |
| Aluminous Cement | B | 4.0 | 56 | 1.0 | 36 | 0.3 | | | | | $CA,C_3A$ |
| Waste Sludge | C | 10.9 | 82.4 | 0.7 | — | 0.1 | 0.8 | 0.2 | 4.6 | 0.2 | p-boehmite |
| Waste Sludge | D | 0.4 | 85.5 | 0.3 | — | 0.3 | 6.5 | 0.1 | 5.1 | 0.1 | p-boehmite |
| Waste Sludge | E | 8.2 | 80.0 | 1.8 | — | 1.1 | 1.3 | 0.1 | 4.0 | | gibbsite |

Remarks
Aluminous cement A and B are commercially available.
$C_2F$ stands for $2CaO.Fe_2O_3$.

The following Table 3 illustrates the kind of products obtained with various mixing ratios of the raw materials, i.e. lime as CaO component, calcium sulfite as $CaSO_4$ component and various $Al_2O_3$ components such as one or more aluminous cements A and B, and sludge of C, D and E. Air was blown into each slurry mixture at a temperature of 80° C. and at an air pressure of $2Kg/cm^2$ for 2 hours.

TABLE 3

Products Prepared from Various Aluminous Materials. $Al_2O_3$ Component

| Mixing mole ratio ($CaO:Al_2O_3:CaSO_4$) | Aluminous cement | | Sludge | | |
|---|---|---|---|---|---|
| | A | B | C | D | E |
| 3  1  3 | Gyp. | Gyp.Ett. | Gyp. | Mono. | Ett. |
| 1.3  1  3 | Ett. | Gyp.Ett. | Gyp. | Mono. | Ett. |
| 1.5  1  3 | Ett. | Ett. | Ett. | Mono. | Ett. |
| 4.5  1  3 | Gyp. Ett. | Gyp.Ett. | Gyp. | Mono. | Ett. |
| 4.3  1  4.3 | Gyp. | Gyp.Ett. Mono. | Gyp.Ett. Mono. | Ett. Mono. | Ett. |
| 2.3  1  2.3 | Ett. | Gyp. Mono. | Ett. Mono. | Ett. | Ett. |

Remarks:
The products were analyzed by using X-ray diffraction.
Gyp. - gypsum dihydrate
Ett. - Ettringite whisker
Mono. - Monosulfate As seen in Table 3, the new form of ettringite crystal whiskers tends to be easily obtained when the components CaO, $Al_2O_3$ and $CaSO_4$ in the slurry are in the mole ratio of about 1.3 to 4.5:1:2.3 to 4.3. However, in other cases shown in Table 3, where it is indicated that no ettringite whiskers were produced, it has been found that the ettringite whiskers might be obtainable by prolonging agitation (reaction) time, for example, to 6 hours for sufficient agitation. This means that agitation is an essential factor for synthesizing ettringite whiskers. Accordingly, another effective treatment for good yield should be agitation of the whole mixture in good efficiency.

In this invention, it is not necessarily essential to specify the ratio of the components CaO, $CaSO_4$ and $Al_2O_3$ because, even if excess amounts of raw materials are unreacted in the reaction mixture, the ettrigite whiskers can be isolated from them by means of filtering and purification, as crystal forms of the raw materials are very small, for example 0.1 to 10 $\mu m$ in size. However, the mole ratio of the components CaO, $Al_2O_3$ and $CaSO_4$ in the slurry reaction mixture is preferably 1.3 to 4.5:1:2.3 to 4.3.

Examples of the methods for synthesizing ettringite crystal whiskers are as follows:

EXAMPLE 1

| Calcium sulfite ($CaSO_3$ ½$H_2O$) | 6 g |
| Aluminous cement | 10 g |
| Calcium hydroxide $Ca(OH)_2$ | 1 g |
| Water | 500 ml |

The above listed materials were placed in a pressure vessel and air was blown into the slurry at a temperature of 80° C. and at an air pressure of 2 $Kg/cm^2$. After about 7 hours the reaction products were filtered off and dried in a desiccator. The product was ettringite crystal whiskers of very high purity as shown by X-ray diffraction analysis. FIG. 3 of the drawings is a photomicrograph of the novel ettringite crystal whiskers obtained by scanning electron micrography (500 magnifications). The ettringite whiskers are 1 to 2 $\mu m$ in diameter, 50 to 100 $\mu m$ in length and have a 30 to 50 aspect ratio.

Using the conditions of this example, but at an oxidation temperature lower than 0° C., ettringite could not be obtained. At a temperature below 70° C., the time required for the synthesis was prolonged, and at a temperature above 100° C., ettringite whiskers could not be obtained.

Figure 2:
FIGS. 1 to 7 are photomicrograph pictures taken on a Scanning Electron Micrography.
Figure 4:
Figure 1:
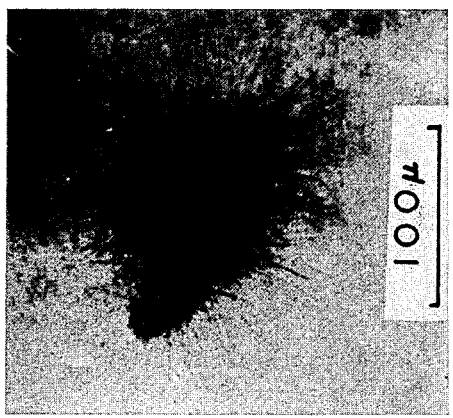

FIG. 4 is a scanning electron photomicrograph (500 magnifications) of gypsum whiskers for comparison. They are whisker-like crystals with aspect ratios approximately the same as those of the novel ettringite crystal whiskers.

A second method of synthesizing the novel ettringite crystal whiskers employs at least one catalyst which accelerate the oxidation and crystal growth and shorten the reaction time in the step of oxidation/stirring mentioned in Example 1. The catalyst may be a metal salt, such as nickel sulfate and iron sulfate. The amount of catalyst used can be about 0.1 to 1.0% of the total weight of the starting materials. Example 2 is an embodiment of this method of ettringite whiskers synthesis.

EXAMPLE 2

Following the procedure of Example 1, but adding 0.1 gram of nickel sulfate ($NiSO_4.7H_2O$) before reaction, ettringite whiskers were obtained which were quite identical to those produced according to Example 1. The time required for the synthesis or production of the ettringite whisker was 2 hours instead of the 7 hours required in Example 1.

The same decrease in reaction time was observed when iron sulfate was used instead of nickel sulfate.

If the amount of the metal salt used is less than 0.1% of the starting materials in total weight, the reaction time reduction will be less. If the amount is more than 1.0% by weight, the reaction products tend to color.

EXAMPLE 3

In this example, the aluminous cement in Examples 1 and 2 is partially replaced with other aluminous materials set forth in Table 2. One or more aluminous materials identified in Table 2 is mixed with the outer materials, i.e. calcium sulfite, calcium hydroxide and water (a metal salt catalyst may be selectively added), and the slurries treated as described in Examples 1 and 2. The ettringite crystal whiskers obtained had the same form as the ettringite crystal whiskers described in Examples 1 and 2. However, the reaction proceeds more rapidly when lime is first mixed with the aluminous material and the mixture then pulverized before the reaction.

A further possible method of synthesizing ettringite whiskers is based on a combination of either one of the above-mentioned methods of synthesizing ettringite whiskers, with the technique concerning the direct production of α-hemihydrate gypsum from sulfur oxides in exhaust gases, which the present inventors have previously disclosed in U.S. patent application Ser. No. 882,913. Thus, ettringite whiskers can be synthesized by adding lime, an aluminous material (preferably one having the composition $C_3A$) and optionally a metal salt catalyst, to a calium sulfite slurry prepared from a desulfurization process, i.e. the gypsum-lime method, the gypsum-limestone method, the soda-lime method and ammonia-lime methods and so on, adjusting the slurry concentration to 5 to 20% solids by weight, effecting oxidation and stirring by blowing air into the slurry at a temperature of 70° to 100° C. at a pressure of air of 2 to 4 Kg/cm$^2$, and filtrating and drying the slurry so treated to separate the ettringite whiskers.

Thirdly, composites containing the ettringite whiskers will be described. The desired composites containing the novel ettringite whiskers are prepared by admixing the highly pure ettringite crystal whiskers of high aspect ratio (dispersoid) synthesized in accordance with the present invention, with one or more materials (matrices). Such materials which can be used are pulp for paper making, resins, gypsum and cement and, as desirable, fibrous materials for reinforcing purposes and light-weight aggregate.

The invention will now be illustrated by way of examples showing various composite embodiments. The ettringite whiskers used in the following examples were the new crystal form of ettringite whiskers provided by this invention.

EXAMPLE 4

A mixture comprised of 90 wt% (available range 50-90 wt%) ettringite crystal whiskers and 10 wt% (available range 10-50 wt%) cellulosic (chemical) pulp from soft wood as a binding material was blended with an amount of water more than 50 times by weight greater than the weight of the starting material. Ettringite whisker-pulp sheets were made from the slurry according to JIS P 8209 "Method of preparing handsheets for pulp-testing." The results showed that the retention of ettringite whiskers was higher than other fillers conventionally used for paper making. The sheets obtained were soft, flexible, smooth in texture and showed printability and far better self-extinguishability.

When the amount of ettringite whiskers used goes below 50 wt%, the properties of the ettringite whisker-pulp sheets are substantially decreased. Specifically, as the amount of the ettringite whiskers used decreased, the strength of the sheets also decreased. To increase the strength of the ettringite whiskers-pulp sheets, the sheets could be impregnated with resins (phenolic, urea, melamine, etc.) and also pressed and cured by heated platens. The resin-impregnated sheets have a number of practical uses.

When compared with sheets made with gypsum whiskers in place of ettringite whiskers, the ettringite whiskers-containing sheets showed far better self-extinguishability. In cases where mixtures of gypsum whiskers and ettringite whiskers in appropriate proportions were used, good results were also obtained.

Heretofore, the conventional, commercially available ettringite was not used in the method of Example 4 i.e, JIS P 8209. The paper making ability of commercially available ettringite is much poorer than that of the ettringite whiskers of this invention.

The strength of pulp sheets made with the commercially available ettringite was weak and, therefore, the sheets could not be used practically. In this respect, the ettringite whiskers-containing sheets of this invention differ from the commercially available ettringite containing sheets in their paper making ability and physical properties. The following reasons are given in explanation of the differences.

Figure 5:
Figure 6:
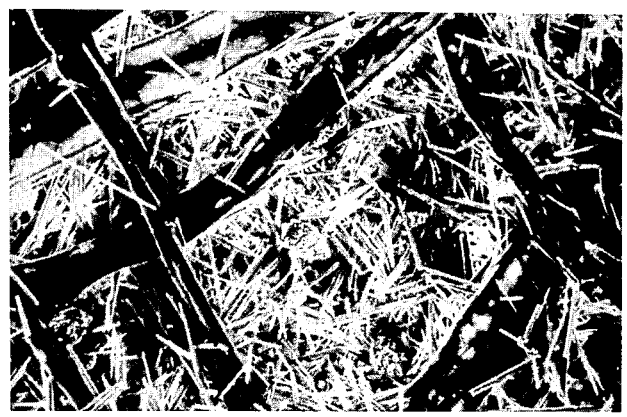
Figure 7:
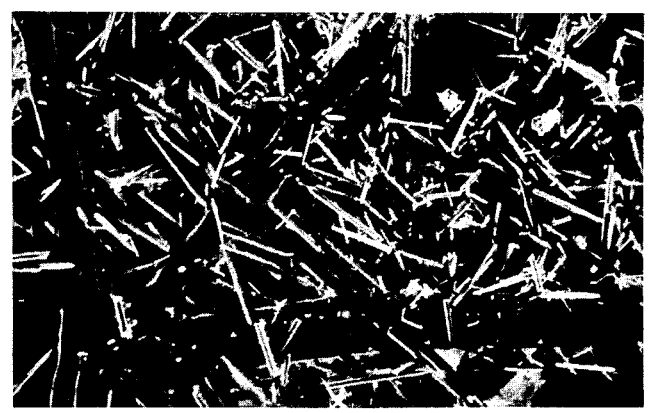

Each of the novel ettringite crystal whiskers is 1 to 2 μm in diameter, 50 to 100 μm in length and has an approximately 30 to 50 aspect ratio so that when used in making sheets of paper, the ettringite whiskers are entangled with the pulp fibers and with each other. As a result, the ettringite whiskers are strongly held in the sheets. The resulting sheets had improved properties because of these reasons. This entangled state of the ettringite whiskers and fibrous pulp is illustrated by FIGS. 5 to 7. On the other hand, the commercially available ettringite is not whisker-like like the ettringite whiskers of this invention.

The entanglement between the commercially available ettringite and chemical pulp is extremely poor, resulting in poor paper making ability. The strength of the sheets obtained was so low as to have no practical use.

EXAMPLE 5

A mixture comprised of 80 wt% (available range is 50-90 wt%) of novel ettringite crystal whiskers, 10 wt% (available range is 2-20 wt%) portland cement, 5 wt% (available range is 2-10 wt%) chemical pulp from soft wood and 5 wt% (available range is 2-20 wt%) gypsum hemihydrate was blended with an equivalent amount of water (available range is an amount by weight 0.4 to 10 times that of the mixture). The resultant slurry was poured into a mold internally covered with a flannel and then filtered and hardened. The board or sheet obtained was slightly compressed. The board had a thickness of 10 mm, a bending strength of 25-60 Kg/cm$^2$, a bulk density of 1.0-1.7 g/cm$^3$ and strong incombustibility and self-extinguishability.

For strong incombustibility and self-extinguishability of the boards, it is necessary that the range of the ettringite whisker used be about 50-90 wt%.

On the other hand, when the commercially available ettringite is used in boards prepared by the above mentioned method, boards having thickness of 10 mm showed a bending strength, of 10-15 Kg/cm$^2$, and a bulk density of 1.2-1.9 g/cm$^3$. The ettringite whisker-containing boards were better than the commercially available ettringite containing boards in physical properties and especially boards making ability.

EXAMPLE 6

A mixture comprised of 70 wt% (available range is 50-90 wt%) of the novel ettringite crystal whiskers, 10 wt% (available range is 2-20 wt%) portland cement, 10 wt% (available range is 2-20 wt%) gypsum hemihydrate and 10 wt% (available range is 10-50 wt%) aggregate (perlite or fine light-weight aggregate) was blended with 2-fold (available range is 0.5-10 fold) water based on the amount of the solids. The resultant slurry was formed in a mold by a wet process under pressure, for example, 2-5 Kg/cm$^2$ and the formed body was cured in an autoclave. The molding had a thickness of 10 mm and showed a bending strength of 10-30 Kg/cm$^2$ and a bulk density of 0.5-0.8 g/cm$^3$.

On the other hand, when moldings were similarly prepared using commercially available ettringite, the moldings having a thickness of 10 mm showed a bending strength of 5-25 Kg/cm$^2$, and a bulk density of 0.8-1.2 g/cm$^3$.

The ratio of bending strength/bulk density of the ettringite whisker-containing moldings was higher than that of the commercially available ettringite-containing moldings. Moreover, it was found that the molding making ability with ettringite whiskers was better than that with the commercially available ettringite.

EXAMPLE 7

As is obvious from the above, the novel ettringite whiskers can be used as reinforcement for articles made of thermosetting resins, such as urea-formaldehyde resins, various phenolic resins, melamine resins and polyester resins.

The incorporation of the ettringite whiskers of this invention into resins produces a substantial improvement in mechanical properties. The ettringite whiskers may be dispersed in air and sprayed with a resin diluted with an appropriate solvent (for example, acetone, benzene, and alcohol) and made into mat-like moldings, which are then cured to a low density (0.2–0.5 g/cm$^3$). They show strong self-extinguishability so that they are suitable as construction or building materials.

In Examples 4–7, the amount of ettringite whiskers was 50 wt% or more in the final products. The final products will be mechanically stronger and less inflammable due to the presence of the ettringite whiskers.

As is clear from the above examples, the ettringite whiskers synthesized by the above methods and having a variety of characteristics, that is to say, the ettringite whiskers (no diffused reflection being observed under a polarization microscope) containing a large amount of water of crystallization and showing a lower solubility in water and other characteristics, when admixed with various kinds of materials for composites, can provide ettringite whiskers composites that can be formed into paper, sheets or boards.

Other industrial applications of the ettringite whiskers include fire-resisting and/or self-extinguishing fillers, reinforcing fibrous materials, and a wide scope of uses for which the electric characteristics and the heat resisting properties of ettringite whiskers are important.

Application of ettringite whiskers to the industrial uses proposed by the present invention will be accelerated by our developments that have for the first time rendered it possible to synthesize beautiful ettringite whiskers with a high aspect ratio, like gypsum whiskers, at low cost by a mass production method, such as the one using exhaust gas desulfurization.

What is claimed is:

1. A method of synthesizing ettringite crystal whiskers which comprises:
    preparing a slurry by mixing together at least 10 parts by weight of water to one part by weight of a starting material mixture comprising
    a. lime as a CaO component
    b. aluminous material as a $Al_2O_3$ component
    c. a $CaSO_4$ precursor supplying component selected from the group consisting of calcium sulphite,
    and a mixture of gypsum and calcium sulphite with the ingredients in said starting material being adjusted so that the mole ratio of CaO, and said $CaSO_4$ component in said slurry is 1.3 to 4.5:1:2.3 to 4.3,
    effecting oxidation by blowing air into, and thereby agitating, the slurry at a temperature between about 0° C. to 100° C., and a blowing air pressure of 2 to 4 Kg/cm$^2$, and
    filtering the thus oxidized slurry to separate ettringite crystal whiskers having a diameter of 1 to 2 μm, a length of 50 to 100 μm and an aspect ratio of about 30 to 50.

2. A method of synthesizing ettringite crystal whiskers according to claim 1, wherein a metal salt which accelerates the oxidation and crystal growth is included in the slurry in an amount of about 0.1 to 1.0% by weight based on the starting material mixture.

3. A method according to claim 2 in which the metal salt is nickel sulfate.

4. A method according to claim 2 in which the metal salt is iron sulfate.

* * * * *